United States Patent [19]
Izumo

[11] Patent Number: 6,106,043
[45] Date of Patent: Aug. 22, 2000

[54] GLOVE BOX STRUCTURE

[75] Inventor: Norifumi Izumo, Hamamatsu, Japan

[73] Assignee: Suzuki Motor Corporation, Shizuokaken, Japan

[21] Appl. No.: 09/159,146

[22] Filed: Sep. 23, 1998

[30] Foreign Application Priority Data

Sep. 24, 1997 [JP] Japan ................................. 9-257418

[51] Int. Cl.[7] .................................................. B60R 7/06
[52] U.S. Cl. ................................. 296/37.12; 312/348.4
[58] Field of Search .............................. 296/37.12, 901; 312/348.1, 348.4, 328, 330.1

[56] References Cited

U.S. PATENT DOCUMENTS

| | | | |
|---|---|---|---|
| 5,197,775 | 3/1993 | Reeber | 296/37.12 |
| 5,385,378 | 1/1995 | Hakamada et al. | 296/37.12 |
| 5,431,442 | 7/1995 | Tomita et al. | 280/748 X |
| 5,845,954 | 12/1998 | DePue | 296/37.12 |

*Primary Examiner*—Joseph D. Pape
*Assistant Examiner*—Paul Chenevert
*Attorney, Agent, or Firm*—McGlew and Tuttle, P.C.

[57] ABSTRACT

It is an object of the present invention to prevent a sink mark from being generated on a design face of a glove box and to enhance rigidity. The present invention provides a glove box structure wherein a design face of a surface and both side faces in a glove box body which is rotatably supported with pivots are integrally molded in a front opening provided on an instrument panel, the glove box structure comprising a thin portion for preventing a sink mark from occurring during molding which is provided on the side faces connected to a back of the design face of the glove box body, and a stiffening rib provided in a connecting portion of the design face with the side face. Consequently, sufficient rigidity can be ensured even though the thin portion is formed in the portion of the side face connected to the design face.

10 Claims, 4 Drawing Sheets

GLOVE BOX STRUCTURE

BACKGROUND OF THE INVENTION AND RELATED ART STATEMENT

1. Field of the Invention

The present invention relates to a glove box structure capable of preventing an undesirable sink mark of a design face (a surface of a lid of a glove box) and of enhancing rigidity.

2. Description of Related Art

An instrument panel for accommodating various instruments is provided in front of a driver's seat inside a car. A glove box made of synthetic resin is provided as a pocket on the assistant driver's seat side of the instrument panel.

In the glove box, usually, a box-shaped glove box body having an open upper face is rotatably supported by pivots on right and left side faces in an opening formed on the instrument panel. By rotating the glove box body toward the outside of the opening, housed articles can be taken in and out of the glove box.

FIGS. 5 and 6 show a conventional glove box. A glove box 100 is integrally molded in such a manner that both side faces 102 connect with a back of a design face 101 provided on a lid. In a portion where the side faces 102 connect with the back of the design face 101, there is a possibility that a sink mark 103 might occur on the design face 101 during molding as shown in FIG. 7. For this reason, conventionally, a groove-shaped thin portion 104 has been formed in the side face 102 portions which connect with the back of the design face 101, thereby preventing the sink mark 103 from being formed on the design face 101.

OBJECT AND SUMMARY OF THE INVENTION

According to such a conventional glove box structure, however, a connecting portion of the side face 102 to the design face 101 tends to be weak. There is a possibility that the glove box structure might be deformed as shown in a two-dotted chain line of FIG. 6.

It is an object of the present invention to solve the above-mentioned problem and provide a glove box structure capable of preventing a sink mark from being formed on a design face and of enhancing rigidity.

In order to solve the above-mentioned problem, a first aspect of the present invention is directed to a glove box structure wherein a design surface and opposite side faces of a glove box body rotatably supported with pivots are integrally molded to be housed in a front opening provided on an instrument panel, the glove box structure comprising a thin portion for preventing a sink mark from occurring during molding, which thin portion is provided on the side faces connected to the back of the design face of the glove box body, and a stiffening rib provided in a portion connecting the design face with the side face, thereby ensuring rigidity of a side face portion on which the thin portion is provided.

A second aspect of the present invention is directed to the glove box structure wherein the height of the stiffening rib is set in such a manner that the glove box body is restrained by an internal wall of the front opening provided on the instrument panel when it is housed in the front opening provided on the instrument panel, thereby restraining a movement of the glove box in the width direction of a car when the glove box body is closed.

DETAILED DESCRIPTION OF PREFERRED EMBODIMENTS

A preferred embodiment of the present invention will be described below in detail with reference to the drawings.

Figure 1:
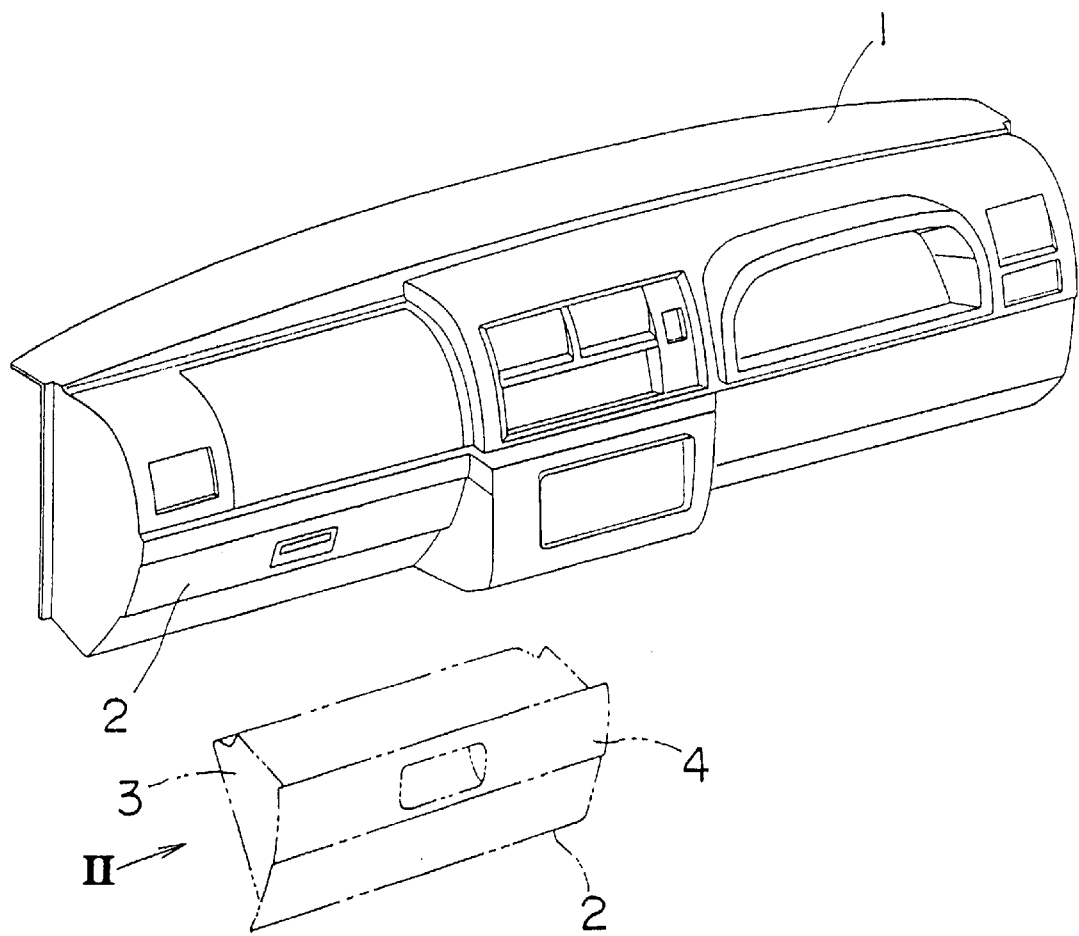
FIG. 1 is a perspective view showing an instrument panel and a glove box body of a car.
Figure 2:
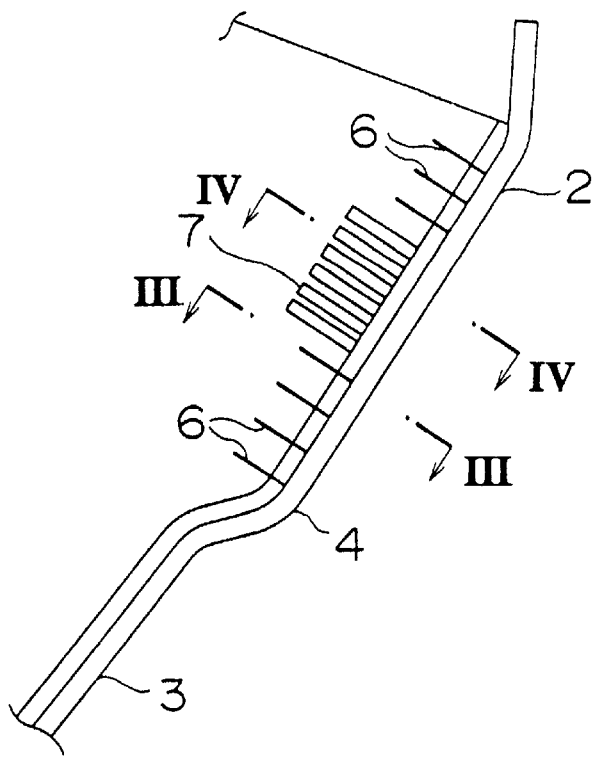
FIG. 2 is a view showing the glove box body of FIG. 1 seen in a direction of an arrow II.
Figure 3:
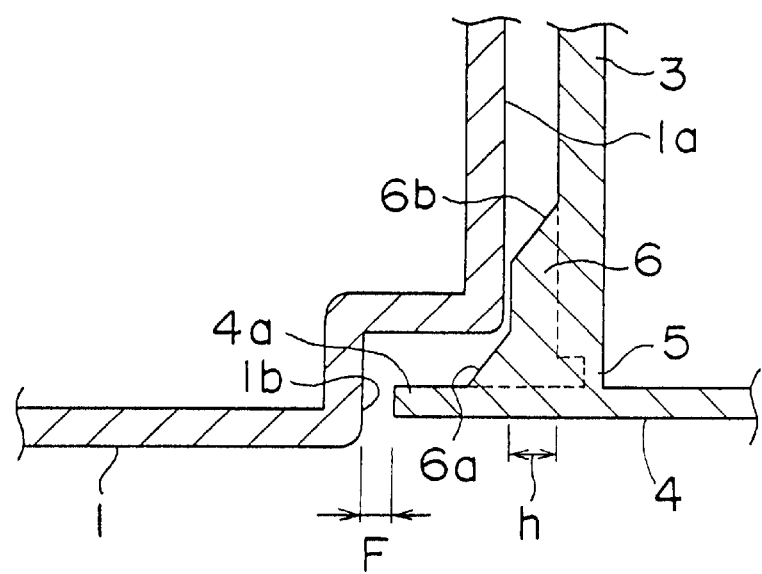
FIG. 3 is a sectional view taken along the line III—III in FIG. 2.
Figure 4:
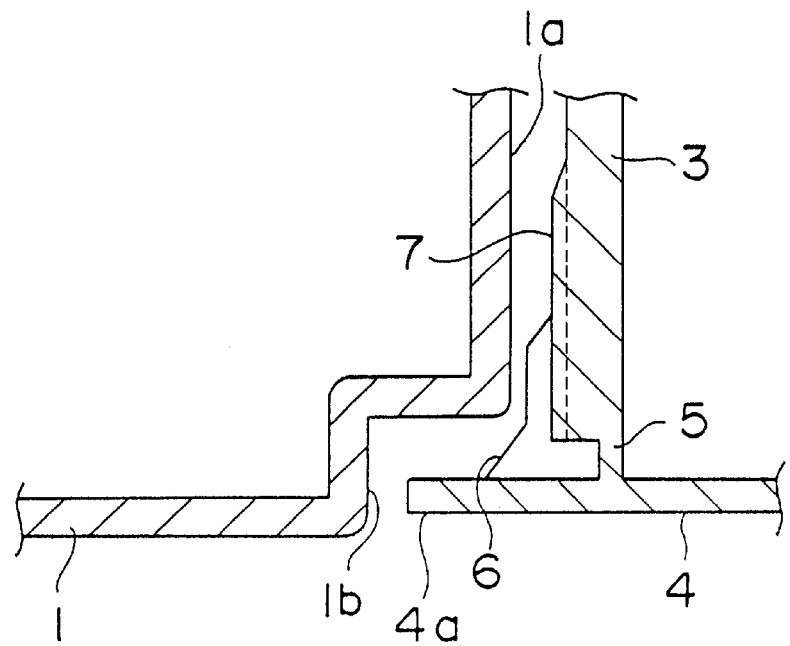
FIG. 4 is a sectional view taken along the line IV—IV in FIG. 2.
Figure 5:
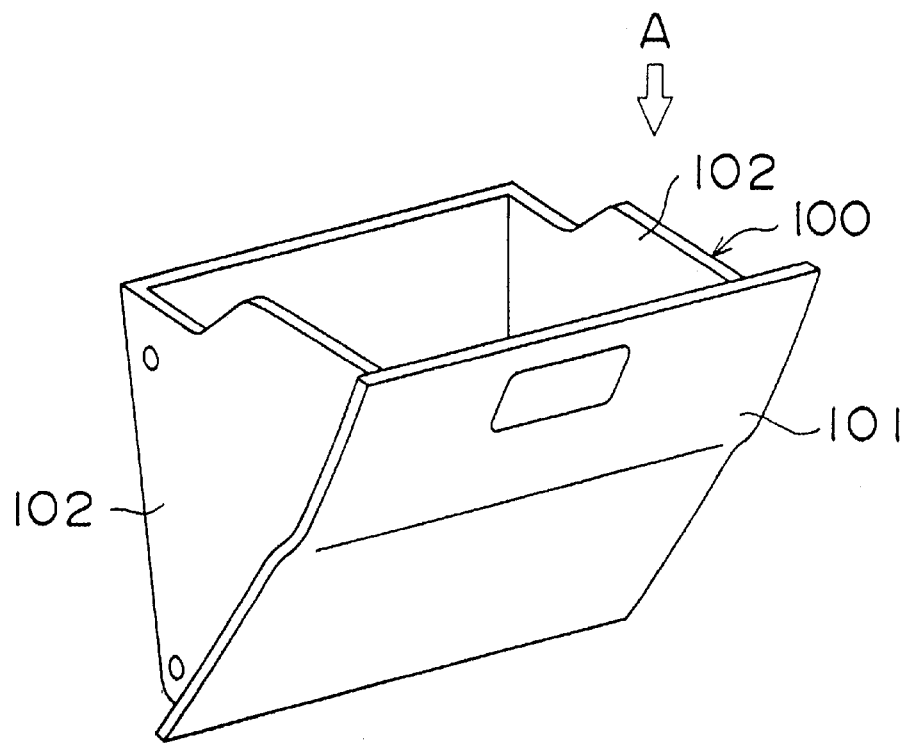
FIG. 5 is a perspective view showing a conventional glove box.
Figure 6:
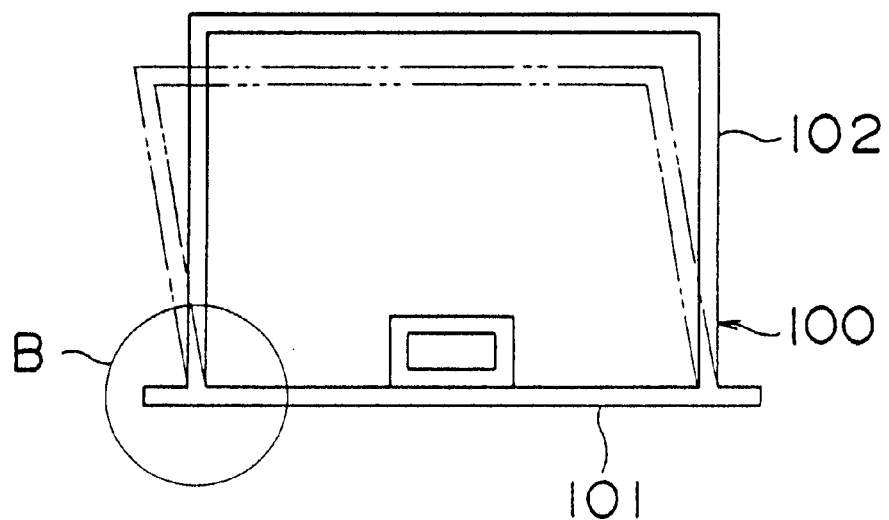
FIG. 6 is a view showing the glove box of FIG. 5 seen in a direction of an arrow VI.
Figure 7:
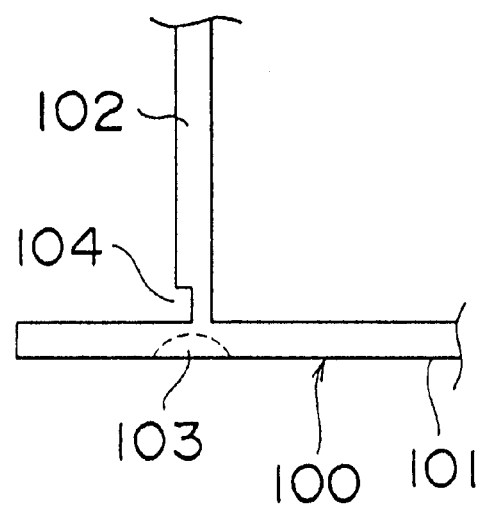
FIG. 7 is an enlarged view showing a VII portion of FIG. 6.

FIGS. 1 to 4 show a glove box structure according to the present invention. FIG. 1 is a perspective view showing an instrument panel and a glove box, FIG. 2 is a view showing the glove box of FIG. 1 in the direction of an arrow II, FIG. 3 is a sectional view taken along the line III—III in FIG. 2, and FIG. 4 is a sectional view taken along the line IV—IV in FIG. 2.

In FIGS. 1 to 4, a glove box body 2 made of synthetic resin is provided as a pocket on the assistant driver's seat side in an instrument panel 1.

The glove box body 2 is attached to an internal wall 1a of an opening provided on the instrument panel 1 with opposite side faces 3 of the glove box body 2 rotatably supported with pivots.

A thin portion 5 is provided in a connecting portion of the side face 3 of the glove box body 2 with a design face 4.

Consequently, a sink mark can be prevented from occurring on the design face 4 during molding.

A plurality of stiffening ribs 6 are formed from the design face 4 side toward the forward end of a car body in the connecting portion of the side face 3 in which the thin portion 5 is provided. The stiffening rib 6 is formed in such a manner that a height h thereof is restrained by the internal wall 1a of the opening of the instrument panel 1 as shown in FIG. 3. The height h being in a direction away from the side face or portion 3. Thus, opposite ends 4a of the design face 4 of the glove box body 2 and an inlet 1b of the opening of the instrument panel 1 form a constant gap F.

The connecting portion of the stiffening rib 6 with the design face 4 forms a positioning slant face 6a in a direction of extension toward the rear of the car body in the width direction of the car, and an end of the stiffening rib 6 toward the forward of the car body forms a guiding slant face 6b which is narrowed toward the forward of the car body in the width direction of the car.

A plurality of projections 7 (6 projections are shown in the example) are formed alongside of the stiffening ribs 6 with a height smaller than a height of the stiffening ribs 6 away from the thin portion 5 (i.e., without covering the thin portion 5). A plurality of stiffening ribs 6 are formed on each side of the plurality of the projections 7. The projections 7 are provided to keep a gap between the glove box and the internal wall 1a of the opening of the instrument panel 1, and perform similar functions as the stiffening ribs 6 does.

According to the above-mentioned structure, the stiffening ribs 6 are formed in the connecting portion of the side face 3 of the glove box body 2. Therefore, sufficient rigidity can be ensured even though the thin portion 5 is formed in the connecting portion with the design face 4. Also when the glove box body 2 is closed into the opening provided on the instrument panel 1, opposite ends 4a of the design face 4 of the glove box body 2 in the width direction of the car can be positioned because positions of the stiffening ribs 6 in the width direction of the car are restrained by the internal wall 1a of the opening of the instrument panel 1. Furthermore, also when the globe box body 2 is to be closed, the slant face 6b serves as a guide. Therefore, the glove box body 2 can be smoothly housed into the opening.

According to the glove box structure of the present invention described above, the following effects can be obtained.

According to the first aspect of the present invention, in the glove box structure wherein the design face of the surface and opposite side faces in the glove box body which is pivotally supported are integrally molded in the front opening provided on the instrument panel, the thin portion for preventing the sink mark from occurring during molding is provided on the side faces connecting to the back of the design face of the glove box body, and the stiffening rib is provided in the connecting portion of the design face with the side face. Therefore, sufficient rigidity can be ensured even though the thin portion is formed in the connecting portion with the design face. Also when the glove box is closed between the internal wall of the opening provided on the instrument panel, the opposite ends of the design face of the glove box body can be securely positioned in the width direction of the car because the stiffening ribs are formed to hold the glove box more rigidly in position between the internal walls of the opening provided on the instrument panel.

According to the second aspect of the present invention, the height of the stiffening rib is set in such a manner that the glove box body is restrained by the internal wall of the front opening provided on the instrument panel when it is housed in the front opening provided on the instrument panel. Therefore, the opposite ends of the design face of the glove box body can be securely positioned in the width direction of the car.

What is claimed is:

1. A glove box arrangement comprising;
an instrument panel with an internal wall and defining an opening;
opposite side portions rotatably positioned on said internal wall and in said opening;
a design face connected to said side portions;
thin portions connecting said side portions to said design face;
a plurality of ribs connected to said side portions and said design face, said ribs, said design face, said side portions and said thin portions all being integrally molded together to rigidly connect said side portion to said design face and prevent a sink mark from being formed, said ribs include a guiding slanted edge on an end of said ribs diametrically opposite said design face, each of said guiding slanted edges including a shape for guiding said side portions along said internal wall when said side portions are inserted into said opening, each of said ribs includes a positioning slanted edge adjacent said design face for positioning said design face in an insertion direction in said opening when said design face is inserted into said opening.

2. The arrangement in accordance with claim 1, wherein:
each of said ribs has a height extending away from said side portions, said height being of a magnitude to define a gap between said ribs and said internal wall, said gap being of a magnitude to limit movement of said side portions in a glove box width direction toward said internal wall and accurately position said design face in said opening in said glove box width direction.

3. A glove box arrangement comprising:
a design face;
a side portion extending from said design face;
a thin portion connecting said side portion to said design face;
a rib connected to said side portion and said design face;
said rib, said design face, said side portion and said thin portion all being molded together to rigidly connect said side portion to said design face and prevent a sink mark from being formed;
wherein a panel is provided with an internal wall defining an opening;
said design face and said side portion are positionable in said opening;
wherein said rib includes a guiding slanted edge on an end of said rib diametrically opposite said design face;
said guiding slanted edge including a shape for guiding said side portion along said internal wall when said side portion is inserted into said opening.

4. The arrangement in accordance with claim 3, wherein:
said rib includes a positioning slanted edge adjacent said design face for positioning said design face in an insertion direction in said opening when said design face is inserted into said opening.

5. The arrangement in accordance with claim 3, wherein:
said rib is connected to said thin portion.

6. The arrangement in accordance with claim 3, wherein:
a plurality of said ribs are molded with said design face, said thin portion and said side portion to increase rigidity and prevent sink marks from being formed.

7. The arrangement in accordance with claim 3, further comprising;
another side portion extending from said design face;
another thin portion connecting said another side portion to said design face;
another rib connected to said another side portion and said design face, said ribs, said design face, said side portions and said thin portions all being molded together to rigidly connect said side portions to said design face and prevent a sink mark from being formed.

8. A glove box arrangement comprising:
a design face;
a side portion extending from said design face;
a thin portion connecting said side portion to said design face;
a rib connected to said side portion and said design face;
said rib, said design face, said side portion and said thin portion all being molded together to rigidly connect said side portion to said design face and prevent a sink mark from being formed;
wherein a panel is provided with an internal wall defining an opening;
said design face and said side portion are positionable in said opening;
wherein said rib has a portion substantially parallel to said internal wall with a height extending away from said side portion;

said height being of a magnitude to define a gap between said rib and said internal wall;

said gap being of a magnitude to limit movement of said side portion in a glove box width direction toward said internal wall and accurately position said design face in said opening in said glove box width direction.

9. A glove box arrangement comprising:

a design face;

a side portion extending from said design face;

a thin portion connecting said side portion to said design face;

a rib connected to said side portion and said design face;

said rib, said design face, said side portion and said thin portion all being molded together to rigidly connect said side portion to said design face and prevent a sink mark from being formed;

wherein a plurality of said ribs are molded with said design face, said thin portion and said side portion to increase rigidity and prevent sink marks from being formed;

wherein a plurality of projections are molded with said side portion to increase rigidity of said side portion.

10. A glove box arrangement comprising:

a design face;

a side portion extending from said design face;

another side portion extending from said design face;

a thin portion connecting said side portion to said design face;

another thin portion connecting said another side portion to said design face;

a rib connected to said side portion and said design face;

another rib connected to said another side portion and said design face;

each of said ribs are connected to said thin portions;

said ribs, said design face, said side portions and said thin portions all being molded together to rigidly connect said side portions to said design face and prevent a sink mark from being formed;

wherein a panel is provided with an internal wall defining an opening;

said design face and said side portions are positionable in said opening;

each of said ribs include a guiding slanted edge on an end of said ribs diametrically opposite said design face;

said guiding slanted edges including a shape for guiding said side portions along said internal wall when said side portions are inserted into said opening;

each of said ribs include a positioning slanted edge adjacent said design face for positioning said design face in an insertion direction in said opening when said design face is inserted into said opening;

said ribs have a height extending away from said side portions;

said height being of a magnitude to define a gap between said ribs and said internal wall;

said gap being of a magnitude to limit movement of said side portions in a glove box width direction toward said internal wall and accurately position said design face in said opening in said glove box width direction;

a plurality of said ribs are molded with said design face, said thin portions and said side portions to increase rigidity and prevent sink marks from being formed;

a plurality of projections are molded with said side portions to increase rigidity of said side portions;

said design face and said side portions are rotatably supported on said panel.

* * * * *